US012751487B2

(12) United States Patent
Yamaguchi

(10) Patent No.: US 12,751,487 B2
(45) Date of Patent: Oct. 6, 2026

(54) AEROSOL GENERATION DEVICE COMPRISING A THERMAL INSULATION WALL AND ASSOCIATED ASSEMBLY METHOD

(71) Applicant: JT International SA, Geneva (CH)

(72) Inventor: Akira Yamaguchi, Geneva (CH)

(73) Assignee: JT International SA, Geneva (CH)

( * ) Notice: Subject to any disclaimer, the term of this patent is extended or adjusted under 35 U.S.C. 154(b) by 507 days.

(21) Appl. No.: 18/272,963

(22) PCT Filed: Jan. 20, 2022

(86) PCT No.: PCT/EP2022/051271
§ 371 (c)(1),
(2) Date: Jul. 18, 2023

(87) PCT Pub. No.: WO2022/157261
PCT Pub. Date: Jul. 28, 2022

(65) Prior Publication Data

US 2024/0148057 A1 May 9, 2024

(30) Foreign Application Priority Data

Jan. 21, 2021 (EP) .................................... 21152796

(51) Int. Cl.
*A24F 40/40* (2020.01)
*A24F 40/60* (2020.01)
(Continued)

(52) U.S. Cl.
CPC .............. *A24F 40/40* (2020.01); *A24F 40/60* (2020.01); *A24F 40/70* (2020.01); *B32B 5/022* (2013.01);
(Continued)

(58) Field of Classification Search
CPC .......... A24F 40/00; A24F 40/10; A24F 40/20; A24F 40/40; A24F 40/70; A24F 40/60; A24F 40/42
See application file for complete search history.

(56) References Cited

U.S. PATENT DOCUMENTS 9,936,735 B1 * 4/2018 Shotey .................... A24F 40/60
2002/0112723 A1 * 8/2002 Schuster ........... A61M 15/0045
128/200.24
(Continued)

FOREIGN PATENT DOCUMENTS

CN 112205669 A 1/2021
JP 2015093392 A 5/2015
(Continued)

OTHER PUBLICATIONS

International Search Report for PCT/EP2022/051271 mailed Apr. 22, 22. 3 pages.

*Primary Examiner* — Alex B Efta
(74) *Attorney, Agent, or Firm* — Lerner David LLP

(57) ABSTRACT

An aerosol generation device includes a housing, the housing defining an internal space, the device including at least a heat source within the internal space; the housing including at least an insulation wall including an inner surface facing the internal space and an outer surface opposite to the inner surface; the device further including a thermal insulation layer arranged on at least a thermo-protected portion of the outer surface of the insulation wall, the thermal insulation layer including a mesh sublayer, the mesh sublayer including an interlaced structure.

17 Claims, 5 Drawing Sheets

(51) Int. Cl.

| | |
|---|---|
| ***A24F 40/70*** | (2020.01) |
| ***B32B 5/02*** | (2006.01) |
| ***B32B 5/26*** | (2006.01) |
| ***B32B 7/12*** | (2006.01) |
| *F16L 59/00* | (2006.01) |

(52) U.S. Cl.

CPC .............. *B32B 5/028* (2013.01); *B32B 5/273* (2021.05); *B32B 7/12* (2013.01); *B32B 2262/0276* (2013.01); *F16L 59/00* (2013.01)

(56) References Cited

U.S. PATENT DOCUMENTS

| | | | | |
|---|---|---|---|---|
| 2015/0101606 | A1* | 4/2015 | White | A61M 15/00 131/194 |
| 2015/0328415 | A1* | 11/2015 | Minskoff | A24F 40/60 128/202.21 |
| 2017/0347711 | A1* | 12/2017 | Litten | A24F 40/485 |
| 2022/0225680 | A1* | 7/2022 | Lopez | A24F 40/465 |
| 2024/0000149 | A1* | 1/2024 | Cross | B32B 9/046 |

FOREIGN PATENT DOCUMENTS

| | | | |
|---|---|---|---|
| JP | 2019085999 | A | 6/2019 |
| WO | 2014113949 | A1 | 7/2014 |
| WO | 2020182774 | A1 | 9/2020 |

* cited by examiner

AEROSOL GENERATION DEVICE COMPRISING A THERMAL INSULATION WALL AND ASSOCIATED ASSEMBLY METHOD

CROSS-REFERENCE TO RELATED APPLICATIONS

The present application is a national phase entry under 35 U.S.C. § 371 of International Application No. PCT/EP2022/051271, filed Jan. 20, 2022, published in English, which claims priority to European Application No. 21152796.5 filed Jan. 21, 2021, the disclosures of which are incorporated herein by reference.

FIELD OF THE INVENTION

The present invention concerns an aerosol generation device comprising a thermal insulation wall.

The present invention also concerns an assembly method of such an aerosol generation device.

BACKGROUND OF THE INVENTION

Different types of aerosol generation devices are already known in the art. Generally, such a device comprises a housing defining an internal space. The internal space comprises a storage portion for storing a vaporizable material that can be for example a liquid or a solid. Usually, the internal space also comprises a heat source. For example, this heat source is a heating system that is made up of one or more electrically activated resistive heating elements arranged to heat said vaporizable material to generate aerosol. The aerosol is released into a flow path extending between an inlet and outlet of the device. The outlet may be arranged as a mouthpiece, through which a user inhales for delivery of the aerosol.

In case of extensive vaping, the heat source can generate a significant amount of heat. This can lead to the heating of the housing in such a way that it may become uncomfortable for a user to hold the device. The user may then be obliged to stop vaping in order to allow the device to cool down.

SUMMARY OF THE INVENTION

One of the aims of the invention is to provide an aerosol generation device in which overheating is reduced.

For this purpose, the invention relates to an aerosol generation device comprising a housing, the housing defining an internal space, the device comprising at least a heat source within the internal space;

- the housing comprising at least an insulation wall comprising an inner surface facing the internal space and an outer surface opposite to the inner surface;
- the device further comprising a thermal insulation layer arranged on at least a thermo-protected portion of the outer surface of the insulation wall, the thermal insulation layer comprising a mesh sublayer, the mesh sublayer comprising an interlaced structure, the interlaced structure comprising through-holes through which the heat generated by the heat source flows from the internal space to the outside of the device, the through-holes having a size between 20 μm and 100 μm.

The interlaced structure of the mesh sublayer forms perforations on the thermo-protected portion of the outer surface. These perforations ease the flow of heat from within the internal space towards the outside of the device.

According to some embodiments, the mesh sublayer is made up of wood or fabric.

Wood and fabric are materials that are relatively good thermal insulators. Therefore, the mesh sublayer allows heat to flow through its mesh openings but conducts only little heat.

According to some embodiments, the thermal insulation layer further comprises a backer sublayer fixed to said thermo-protected portion and an adhesive sublayer fixed to the backer sublayer, the mesh sublayer being fixed to the adhesive sublayer.

Thanks to these features, the mesh sublayer is firmly attached to the insulation wall.

According to some embodiments, the aerosol generation device further comprises a heat-diffusion layer arranged between at least a thermo-diffusion portion of the inner surface of the insulation wall and the internal space of the device.

According to some embodiments, the heat-diffusion layer extends substantially parallel to a plane of extension of the insulation wall.

According to some embodiments, the heat-diffusion layer is a heat-conducting plate.

According to some embodiments, the heat-conducting plate is made up of copper.

Thanks to these features, the heat generated by the heat source is diffused throughout the housing. This makes it possible to avoid the accumulation of heat in a narrow space surrounding the heat source. This also widens the surface of heat exchange with the thermo-protected portion. The flow of heat through the mesh sublayer is increased.

According to some embodiments, the aerosol generation device further comprises a support attached to the housing and extending within the internal space and at least a magnet arranged on the support to fix the heat-diffusion layer to the support.

Thanks to these features, the heat-diffusion layer is easily fixed to the device.

According to some embodiments, the aerosol generation device further comprises a light source within the internal space of the device.

According to some embodiments, the heat-diffusion layer comprises a light orifice arranged facing the light source.

Thanks to these features, despite the presence of the heat-diffusion layer, a user can acknowledge whether the device is powered on or not thanks to the light coming from the light source and passing through the light orifice.

According to some embodiments, the insulation wall is a removable wall of the housing.

Thanks to these features, the insulation wall is customizable. A user of the device can choose a specific insulation wall depending on its insulation features or depending on other features such as its appearance or its texture.

According to some embodiments, the heat source is a heating system configured to generate aerosol from a vaporizable material.

The heating system of an aerosol generation device may generate a significant amount of heat. Thanks to these features, the device can evacuate important amounts of heat coming from its heating system.

The invention also relates to an assembly method of an aerosol generation device as disclosed above, comprising a step of fixing of the thermal insulation layer on the thermo-protected portion of the outer surface of the insulation wall.

According to some embodiments, the thermal insulation layer further comprises a backer sublayer fixed to the thermo-protected portion and an adhesive sublayer fixed to the backer sublayer, the mesh sublayer being fixed to the adhesive sublayer, the fixing step comprising:

fixing the adhesive sublayer on the backer sublayer;

placing the mesh sublayer onto the adhesive sublayer to form the thermal insulation layer;

placing the thermal insulation layer into a heating press;

pressing and heating the thermal insulation layer to fix the mesh sublayer to the adhesive sublayer;

cutting the thermal insulation layer into dimensions fitting with dimensions of said thermo-protected portion;

fixing the backer sublayer on said thermo-protected portion.

DETAILED DESCRIPTION OF THE INVENTION

Before describing the invention, it is to be understood that it is not limited to the details of construction set forth in the following description. It will be apparent to those skilled in the art having the benefit of the present disclosure that the invention is capable of other embodiments and of being practiced or being carried out in various ways.

As used herein, the term "aerosol generation device" or "device" may include a vaping device to deliver an aerosol to a user, including an aerosol for vaping, by means of aerosol generating unit (e.g. an aerosol generating element which generates vapor which condenses into an aerosol before delivery to an outlet of the device at, for example, a mouthpiece, for inhalation by a user). The device may be portable. "Portable" may refer to the device being for use when held by a user. The device may be adapted to generate a variable amount of aerosol, e.g. by activating a heating system for a variable amount of time (as opposed to a metered dose of aerosol), which can be controlled by a trigger. The trigger may be user activated, such as a vaping button and/or inhalation sensor. The inhalation sensor may be sensitive to the strength of inhalation as well as the duration of inhalation to enable a variable amount of vapor to be provided (so as to mimic the effect of smoking a conventional combustible smoking article such as a cigarette, cigar or pipe, etc.).

As used herein, the term "aerosol" may include a suspension of precursor as one or more of: solid particles; liquid droplets; gas. Said suspension may be in a gas including air. Aerosol herein may generally refer to/include a vapor. Aerosol may include one or more components of the precursor.

As used herein, the term "vaporizable material" or "aerosol-forming precursor" or "precursor" or "aerosol-forming substance" or "substance" may refer to one or more of a: liquid; solid; gel; mousse; foam or other substances. The precursor may be processable by the heating system of the device to form an aerosol as defined herein. The precursor may comprise one or more of: nicotine; caffeine or other active components. The active component may be carried with a carrier, which may be a liquid. The carrier may include propylene glycol or glycerine. A flavoring may also be present. The flavoring may include Ethylvanillin (vanilla), menthol, Isoamyl acetate (banana oil) or similar. A solid aerosol forming substance may be in the form of a rod, which contains processed tobacco material, a crimped sheet or oriented strips of reconstituted tobacco (RTB).

Figure 1:
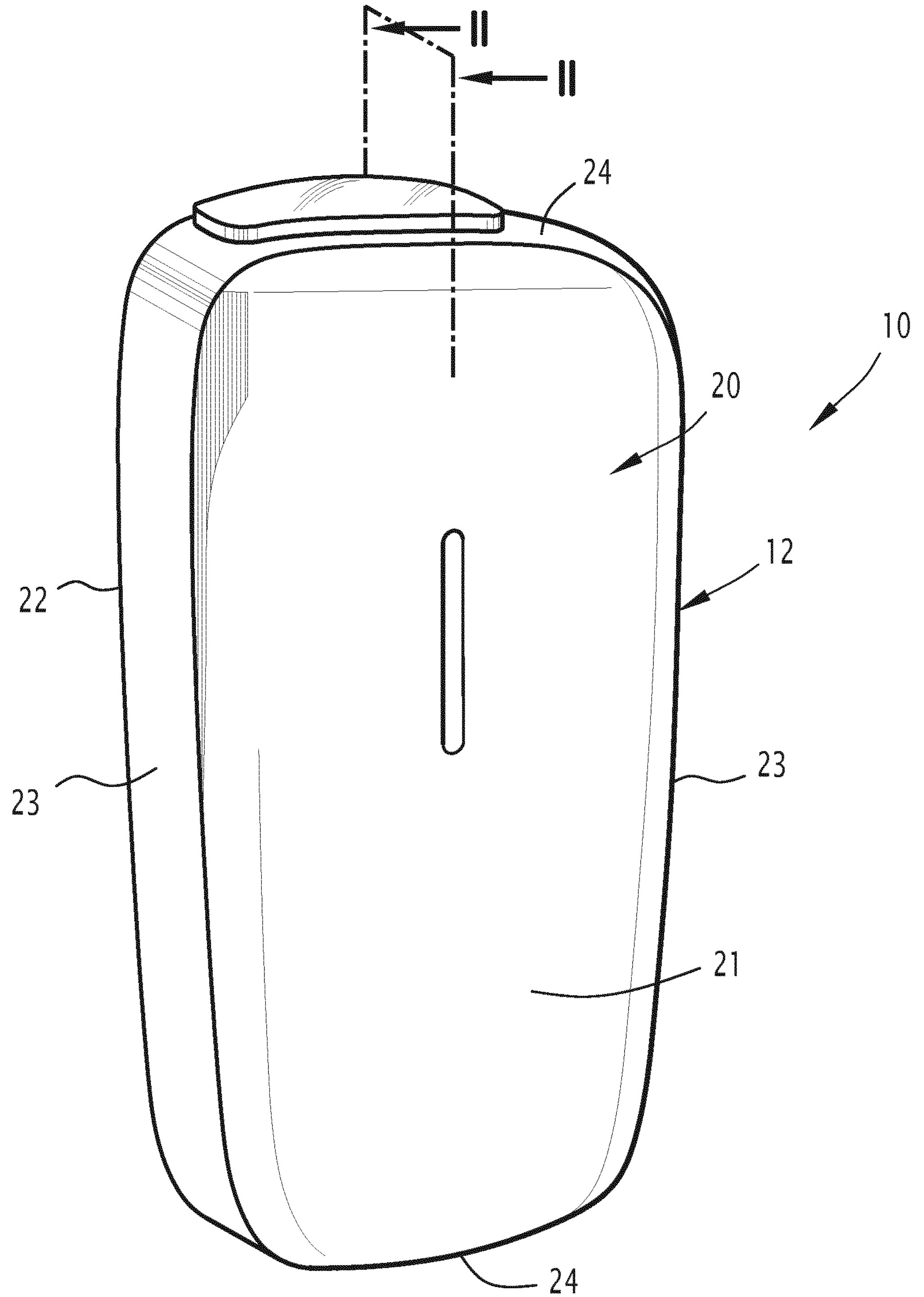
FIG. 1 is a perspective view of an aerosol generation device according to the invention.
Figure 2:
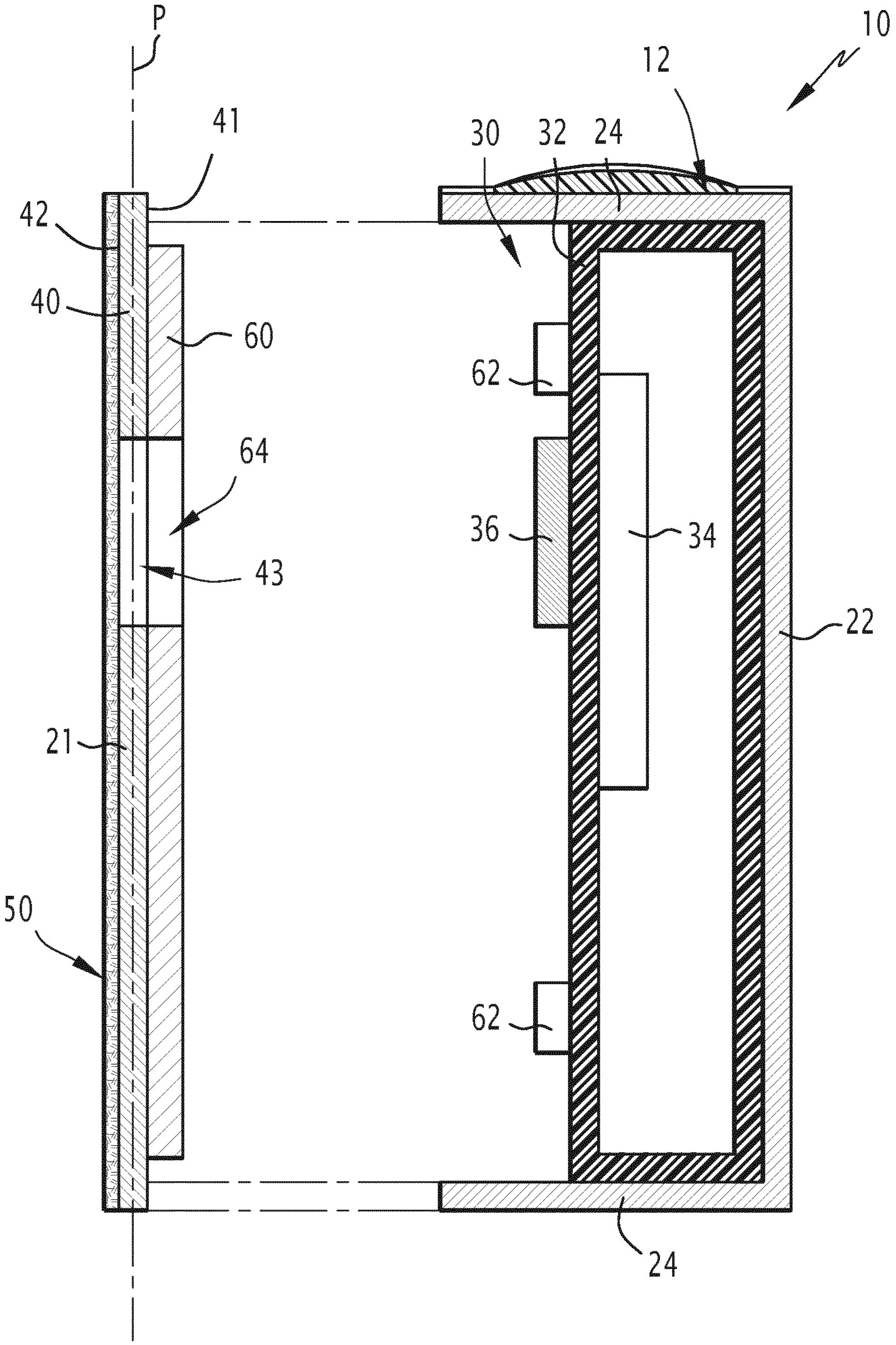
FIG. 2 is a simplified cross-sectional view along vertical plane II-II of the aerosol generation device of FIG. 1.

Referring to FIGS. 1 and 2, an aerosol generation device 10 according to the invention comprises a housing 12. For example, as shown on FIG. 1, the housing 12 has a substantially parallelepiped shape with slightly rounded edges. The housing 12 comprises walls 20 defining an internal space 30 of the device 10. For example, the housing 12 comprises a front wall 21, an opposite rear wall 22, two lateral side walls 23 and two upper and lower side walls 24.

The device 10 further comprises a support 32 attached to the housing 12, extending within the internal space 30 and configured to support functional components of the device 10. The support 32 may be formed by a chassis adapted to receive and fix such functional components within the housing 12. For example, such functional components comprise electronic components, a battery or a power supply designed to power said electronic components. In some embodiments, the functional components may further comprise a storage portion (non-illustrated) for storing vaporizable material. In these embodiments, the storage portion is thus arranged inside the housing 12. It can be refilled in this case directly with vaporizable material or using a removable cartridge designed to be inserted in such a portion. In some other embodiments, a storage portion may be formed outside the housing 12, for example by a removable cartridge. In this case, the housing 12 defines fixing means configured to receive and fix the removable cartridge.

The device 10 further comprises at least a heat source 34 arranged within the internal space 30. For example, the heat source 34 is attached to the support 32 and is comprised in a heating system of the device 10, configured to generate aerosol by heating vaporizable material. In this case, the heat source 34 may correspond to a heating element used to heat the vaporizable material comprised in the storing portion, like for example a heating plate, electrical resistance or susceptor. According to other examples, the heat source 34 is formed by the battery and/or power supply of the device or any other electrical component of the device. In some examples, the heat source 34 is formed by several components among the components cited above.

In case of extensive use of the device 10, the heat source 34 can generate a significant amount of heat. This can lead to an overheating of the device 10, in particular to an overheating of the housing's walls 20. A user of the device 10 may then feel this unpleasant heat on its hands. In case of severe overheating, the user may suffer from it and the bearing of the device 10 may become impossible. It may then become necessary to shut down the heat source 34 in order to avoid damage to the device 10.

Figure 3:
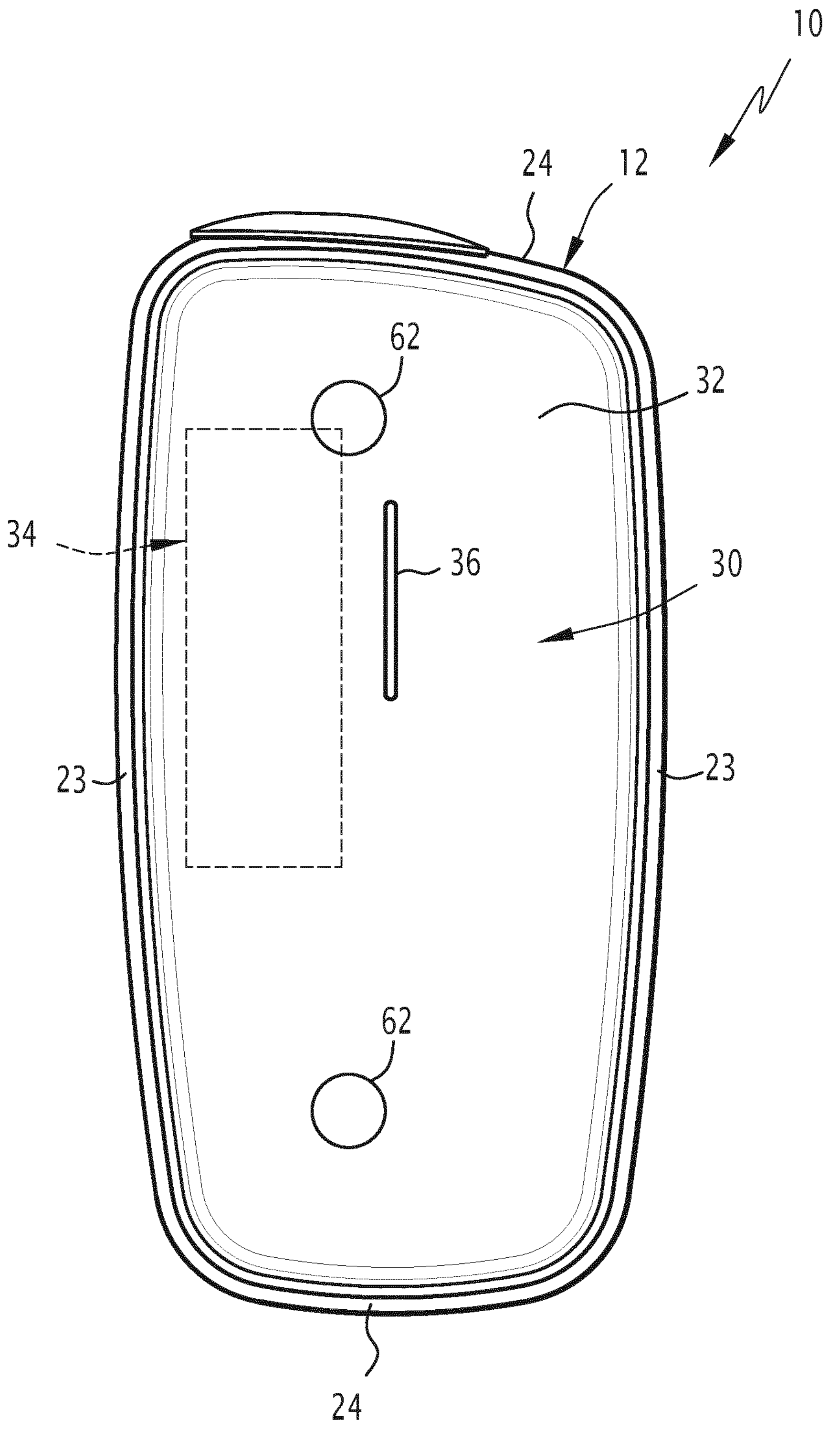
FIG. 3 is a simplified front view of the aerosol generation device of FIG. 1 in which the insulation wall has been removed.

For example, as illustrated on FIGS. 2 and 3, the device 10 further comprises a light source 36 arranged within the internal space 30. For example, the light source 36 is attached to the support 20 and faces the front wall 21 of the housing. For example, it is configured to emit light when the device 10 is on, in particular when the battery or the power supply supplies power to the electronic components of the device or to the heating system to generate aerosol.

Figure 4:
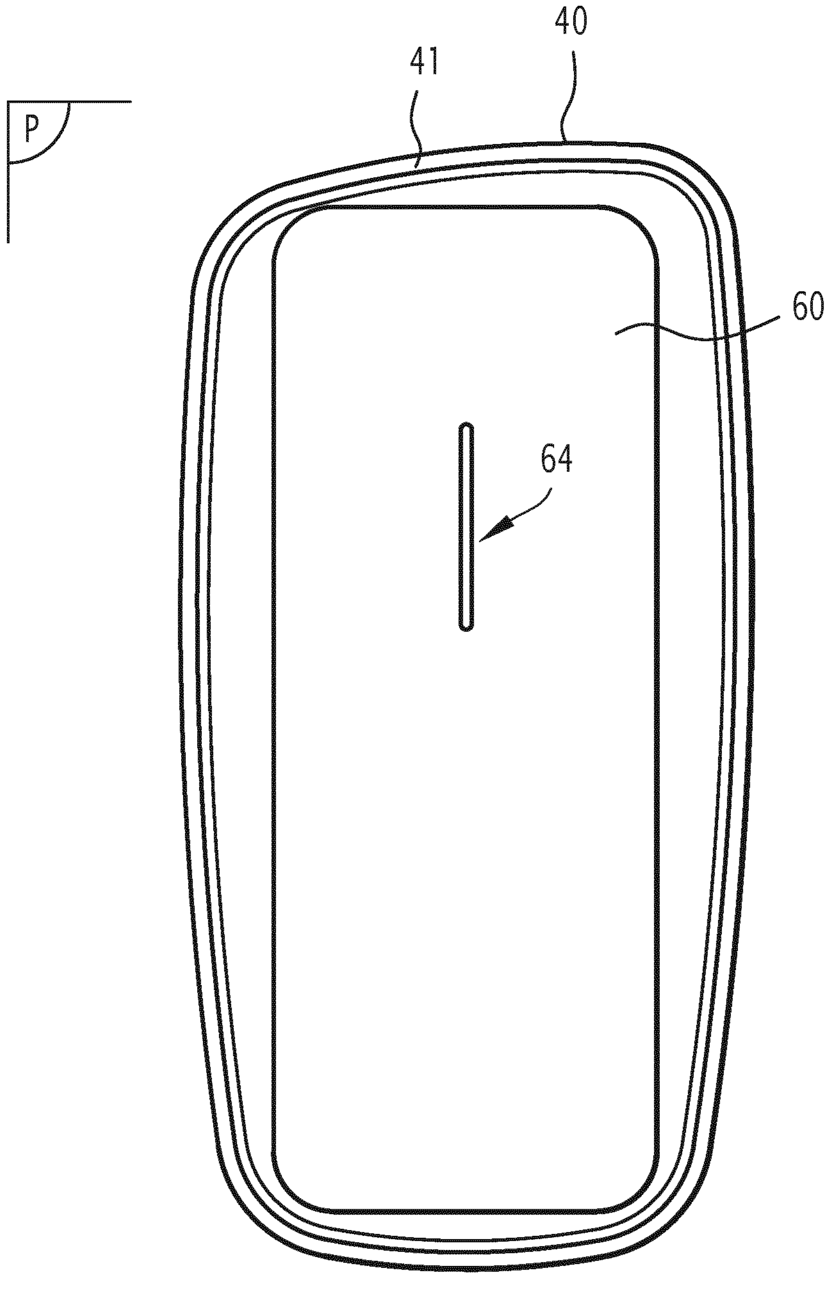
FIG. 4 is a simplified rear view of the insulation wall of the aerosol generation device of FIG. 1.

In view of FIGS. 2 and 4, the housing 12 comprises at least an insulation wall 40. For example, the insulation wall 40 is one of the walls 20 of the housing 12, for example the front wall 21. For example, the insulation wall 40 extends substantially along a plane of extension P. It comprises an inner surface 41 facing the internal space 30 and an outer surface 42 opposite the inner surface 41. The insulation wall 40 is for example a removable wall of the housing 12 movable between a mounted position (FIG. 1) in which the insulation wall 40 is mounted on the housing 12 and a spaced away position (FIGS. 2, 3 and 4) in which it is spaced away from the housing 12. In the mounted position, the insulation wall 40 protects the internal space 30 from external elements, for example dust or water. As it will be explained below, in the mounted position, the insulation wall 40 also regulates the flow of heat coming from the heat source 34. In the spaced away position, the user can access the internal space 30 for example for repairing or maintenance of the functional elements of the device 10. In some embodiments, the user can access the internal space 30 to refill the storage portion directly with vaporizable material or with a removable cartridge.

The insulation wall 40 can also be removed and replaced by another insulation wall 40 presenting different features such as another aspect or another texture of the outer surface 42. For example, the insulation wall 40 is fixed to the other walls of the housing 12 or the support 32 by snap fitting. For example, the lateral side walls 23 and the upper and lower side walls 24 comprise a peripheral snap fitting box (non-illustrated) on their forward edge. The insulation wall 40 may comprise a peripheral snap fitting pin on its edges designed to cooperate with the peripheral snap fitting box in order to attach the insulation wall 40 to the walls 23, 24 in the mounted position.

In some embodiments, as for example in the embodiment shown on FIG. 2, the insulation wall 40 comprises a light orifice 43 designed to let the light emitted by the light source 36 pass through and reach the outside of the device 10. For example, the light orifice 43 of the insulation wall 40 is filled with a translucent material in order to allow the emitted light to pass through but to prevent external elements from entering the internal space 30.

The outer surface 42 of the insulation wall 40 comprises at least a thermo-protected portion. The device 10 comprises a thermal insulation layer 50 arranged on the thermo-protected portion, for example, fixed to the thermo-protected portion. As illustrated on the example of FIG. 2, the thermo-protected portion corresponds to the entire outer surface 42. According to other embodiments of the invention, the thermo-protected portion corresponds to a part of the outer surface 42, for example to a part of the outer surface 42 facing the heat source 34.

Figure 5:
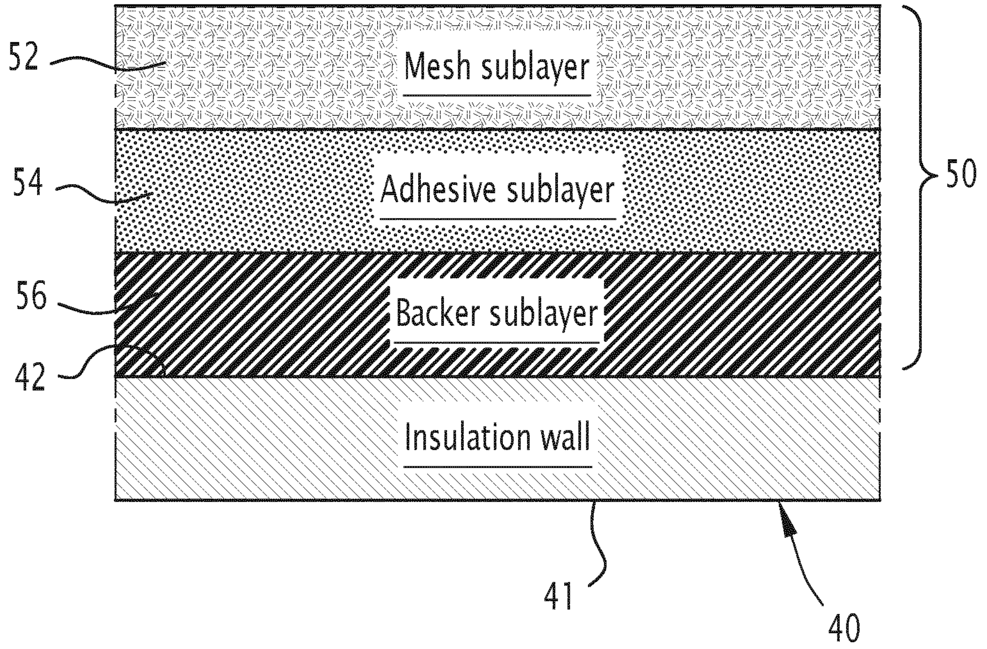
FIG. 5 is a cross sectional view of the insulation wall and of the thermal insulation layer of the device of FIG. 1, taken perpendicularly to the plane of extension of the insulation wall.

As shown on FIG. 5, the thermal insulation layer 50 comprises a mesh sublayer 52. For example, the thermal insulation layer 50 further comprises an adhesive sublayer 54 and a backer sublayer 56. For example, the backer sublayer 56 is fixed on the outer surface 42 of the insulation wall 40, the adhesive sublayer 54 is placed on top of the backer sublayer 56 and the mesh sublayer 52 is placed on top of the adhesive sublayer 54.

The mesh sublayer 52 comprises an interlaced structure of a material such as, for example, wood or fabric. The mesh sublayer 52 is thus made up of interlaced fibers. For example, the mesh sublayer 52 is made up of wood fibers or fabric fibers. Wood fibers are for example made up of cellulose. For example, fabric fibers are made up of cotton, polyester, nylon, acrylic and/or polyurethane. The interlaced structure may be a woven or non-woven structure of wood fibers or fabric fibers. Such interlaced structure comprises through-holes through which the heat generated by the heat source 34 flows from the internal space 30 to the outside of the device 10. For example, the mesh sublayer 52 extends facing the entire outer surface 42 of the insulation wall 40. For example, the mesh sublayer 52 is fixed on the adhesive sublayer 54. The through-holes of the mesh sublayer 52 also let the light emitted by the light source 36 pass through and reach the outside of the device 10. For example, the through-holes have a size between 20 μm and 100 μm, preferably between 30 μm and 90 μm, more preferably between 40 μm and 80 μm, even more preferably between 50 μm and 70 μm, notably substantially equal to 60 μm. Of course, other value ranges are possible for the size of the through-holes.

The backer sublayer 56 is fixed to the thermo-protected portion. For example, the backer sublayer 56 is made up of non-woven fibers. For example, said non-woven fibers are made up of polyester.

The adhesive sublayer 54 is fixed to the backer sublayer. For example, the adhesive sublayer 54 is made up of glues of thermoplastic resin which flexibly change its shape. For example, the adhesive sublayer 54 is made up of hot melt glues like acrylic resin adhesive. For example, the mesh sublayer 52 is fixed to the adhesive sublayer 54 and is therefore fixed to the insulation wall 40 via the adhesive sublayer 54 and the backer sublayer 56. For example, the backer sublayer 56 and the adhesive sublayer 54 extend facing only parts of the thermo-protected portion and only parts of the mesh sublayer 52. This way, the backer sublayer 54 and the adhesive sublayer 56 do not disrupt the flow of heat from the heat source 34 to the outside of the device 10 but still firmly attach the mesh sublayer 52 to the insulation wall 40.

Referring to FIG. 2, the inner surface 41 of the insulation wall 40 comprises at least a thermo-diffusion portion. For example, the device 10 further comprises a heat-diffusion layer 60 arranged between the thermo-diffusion portion of the inner surface 41 of the insulation wall 40 and the internal space 30 of the device 10. The heat-diffusion layer 60 extends substantially parallel to the plane of extension P of the insulation wall 40. For example, it is fixed to the inner surface 41 of the insulation wall 40. The heat-diffusion layer 60 is for example a heat-conducting plate, for example made up of copper or any other heat-diffusion material. The heat-diffusion layer 60 is configured to diffuse the heat generated by the heat source 34 throughout its entirety, for example throughout the plane of extension P. The heat-diffusion layer 60 spreads the generated heat on an increased surface facing the thermos-protected portion. The heat exchange surface between the internal space 30 and the outside of the device 10 is therefore increased. For example, as shown on FIG. 2, the heat-diffusion layer 60 comprises a light orifice 64 arranged facing the light source 36 when the insulation wall 40 is in its mounted position. In the mounted position of the insulation wall 40, the light emitted by the light source 34 exits the housing 12 through the light orifice 64 of the heat-diffusion layer 60, the light orifice 43 of the insulation wall 40 and through the through-holes of the mesh sublayer 52.

For example, as shown on FIGS. 2 and 3, the device 10 further comprises at least a magnet 62 arranged on the support 32 to fix the heat-conducting plate to the support 32 when the heat-conducting plate is made up of a ferromagnetic material like copper. For example, as shown on FIGS. 2 and 3, the device 10 comprises two magnets 62. The magnets 62 account for an additional fixation means between the insulation wall 40 and the walls 23, 24.

It would apparent for one skilled in the art, that the thermal insulation layer 50 and the heat-diffusion layer 60 as described above can be arranged on any other wall 20 of the housing 12, depending notably on the arrangement of the heat source 34 inside the housing. In some embodiments, these layers 50, 60 can be arranged on several walls 20 or on a unique lateral wall 20 when for example the housing 12 has a cylindrical shape.

An operation method of the aerosol generation device 10 will now be explained. A user of the device 10 activates a vaping button or an inhalation sensor in order to generate aerosol. By doing so, the heat source 34 is powered on and generates heat. For example, when the heat source 34 generates heat, the light source 36 emit light. The user of the device 10 can then acknowledge that the heat source 34 is powered on by seeing the light emitted through the light orifices 64 and 43 and through mesh sublayer 52. The heat-diffusion layer 60 diffuses the heat generated by the heat source 34 throughout its entirety. The heat is for example diffused over an extended surface parallel to the plane of extension P. The diffused heat then flows through the insulation wall 40 and through the through-holes of the mesh sublayer 52 from within the internal space 30 to the outside of the device 10. This lead to an efficient cooling of the internal space 30 and of the housing 12. Even in case of extensive vaping, overheating of the walls 20 is prevented.

If needed, the user can remove the insulation wall 40 together with the thermal insulation layer 50 and the heat-diffusion layer 60 and replace it with a different insulation wall comprising, for example, different layers 50, 60 or a different aspect or texture.

An assembly method of the aerosol generation device 10 will now be explained. The assembly method comprises a step of fixing of the thermal insulation layer 50 on the thermo-protected portion of the outer surface 42 of the insulation wall 40. Said fixing step comprises fixing the adhesive sublayer 54 on the backer sublayer 56. The mesh sublayer 52 is then placed onto the adhesive sublayer 54 to form the thermal insulation layer 50. The thermal insulation layer 50 is then placed into a heating press. The thermal insulation layer 50 is pressed and heated within the heating press to fix the mesh sublayer 52 to the adhesive sublayer 54. The thermal insulation layer is then cut into dimensions fitting with dimensions of said thermo-protected portion. Finally, the backer sublayer 56 is fixed on said thermo-protected portion. Therefore, as shown, the implementation of the thermal insulation layer 50 on a wall 20 of a housing 12 of a conventional device is made easy.

The invention claimed is:

1. An aerosol generation device comprising a housing, the housing defining an internal space, the device comprising at least a heat source within the internal space;

- the housing comprising at least an insulation wall comprising an inner surface facing the internal space and an outer surface opposite to the inner surface;
- the device further comprising a thermal insulation layer arranged on at least a thermo-protected portion of the outer surface of the insulation wall, the thermal insulation layer comprising a mesh sublayer, the mesh sublayer comprising an interlaced structure, the interlaced structure comprising through-holes through which heat generated by the heat source flows from the internal space to an outside of the device, the through-holes having a size between 20 μm and 100 μm.

2. The aerosol generation device according to claim 1, wherein the mesh sublayer is made up of wood or fabric.

3. The aerosol generation device according to claim 1, wherein the thermal insulation layer further comprises a backer sublayer fixed to said thermo-protected portion and an adhesive sublayer fixed to the backer sublayer, the mesh sublayer being fixed to the adhesive sublayer.

4. The aerosol generation device according to claim 1, further comprising a heat-diffusion layer arranged between at least a thermo-diffusion portion of the inner surface of the insulation wall and the internal space of the device.

5. The aerosol generation device according to claim 4, wherein the heat-diffusion layer extends substantially parallel to a plane of extension of the insulation wall.

6. The aerosol generation device according to claim 4, wherein the heat-diffusion layer is a heat-conducting plate.

7. The aerosol generation device according to claim 6, wherein the heat-conducting plate is made up of copper.

8. The aerosol generation device according to claim 4, further comprising a support attached to the housing and extending within the internal space and at least a magnet arranged on the support to fix the heat-diffusion layer to the support.

9. The aerosol generation device according to claim 1, further comprising a light source within the internal space of the device.

10. The aerosol generation device according to claim 4, further comprising a light source within the internal space of the device, wherein the heat-diffusion layer comprises a light orifice arranged facing the light source.

11. The aerosol generation device according to claim 1, wherein the insulation wall is a removable wall of the housing.

12. The aerosol generation device according to claim 1, wherein the heat source is a heating system configured to generate aerosol from a vaporizable material.

13. An assembly method of the aerosol generation device according to claim 1, comprising a step of fixing of the thermal insulation layer on the thermo-protected portion of the outer surface of the insulation wall.

14. The assembly method according to claim 13, wherein the fixing step comprises:

- fixing an adhesive sublayer of the thermal insulation layer on a backer sublayer of the thermal insulation layer;
- placing the mesh sublayer onto the adhesive sublayer to form the thermal insulation layer;
- placing the thermal insulation layer into a heating press;
- pressing and heating the thermal insulation layer to fix the mesh sublayer to the adhesive sublayer;
- cutting the thermal insulation layer into dimensions fitting with dimensions of said thermo-protected portion; and
- fixing the backer sublayer on said thermo-protected portion.

15. The aerosol generation device according to claim 1, wherein the heat source comprises a heating element configured to generate aerosol from a vaporizable material.

16. The aerosol generation device according to claim 1, wherein the heat source comprises a heating plate.

17. The aerosol generation device according to claim 1, wherein the heat source comprises a susceptor.

* * * * *